United States Patent [19]

Jennen et al.

[11] 4,446,682
[45] May 8, 1984

[54] AGRICULTURAL ATTACHMENT FOR HARVESTING AGRICULTURAL PRODUCTS ARRANGED IN ROWS

[75] Inventors: Wolfgang Jennen; Gerd Sprügel, both of Harsewinkel, Fed. Rep. of Germany

[73] Assignee: Claas OHG, Harsewinkel, Fed. Rep. of Germany

[21] Appl. No.: 328,095

[22] Filed: Dec. 7, 1981

[30] Foreign Application Priority Data

Dec. 20, 1980 [DE] Fed. Rep. of Germany ....... 3048327

[51] Int. Cl.³ ............................................ A01D 45/02
[52] U.S. Cl. ........................................ 56/119; 56/98; 56/319
[58] Field of Search ....................... 56/94, 95, 98, 119, 56/319

[56] References Cited

U.S. PATENT DOCUMENTS

| | | | |
|---|---|---|---|
| 1,117,460 | 11/1914 | Spangler | 56/98 |
| 3,271,940 | 9/1966 | Ashton et al. | 56/119 X |
| 3,388,538 | 6/1968 | Markham | 56/98 |
| 4,160,355 | 7/1979 | Blake et al. | 56/98 |

Primary Examiner—Robert P. Swiatek
Attorney, Agent, or Firm—Michael J. Striker

[57] ABSTRACT

An agricultural attachment for harvesting agricultural products arranged in rows, such as corn and the like, has a frame, a plurality of product drawing elements, and a plurality of hingedly mounted dividing elements associated with the product drawing elements so as to form together with the latter product drawing passages, wherein each of the drawing elements have two parts which are articulately connected with one another so that they are pivotable relative to one another to assume a position in which they have a tipped roof shape and are fixable in this position.

7 Claims, 3 Drawing Figures

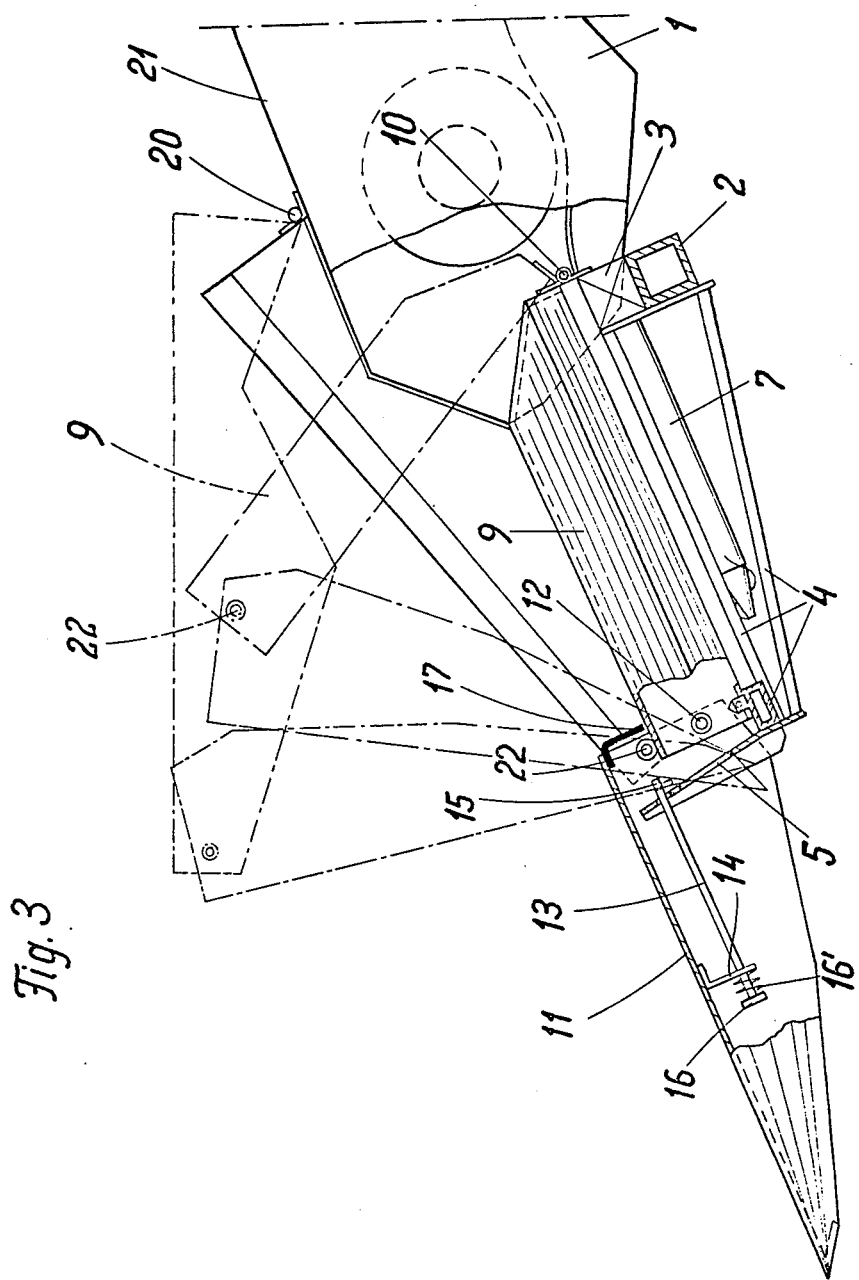

AGRICULTURAL ATTACHMENT FOR HARVESTING AGRICULTURAL PRODUCTS ARRANGED IN ROWS

BACKGROUND OF THE INVENTION

The present invention relates to an agricultural attachment for harvesting agricultural products arranged in rows, particularly corn.

Agricultural attachments of the above-mentioned general type are known in the art. Known agricultural attachments have a plurality of drawing passages which are formed by closed drawing organs and support inner and outer dividers. The inner dividers are hingedly connected at their rear ends with a frame of the attachment. In the main known agricultural attachment of this type, particularly corn picker, each divider has a hood-shaped body part and a tip part which are together pivotable to an upright position and can be held in this upright position by a support inserted between the divider body part and the frame of the attachment. When the body part and the tip of the divider are in the above-mentioned position, required cleaning and repair works can be easily carried out. After termination of this work, it is necessary to bring the hood-like body of the dividers to a working position before travelling of the corn picker, as much as the hood-like divider body parts are very unstable in their upright position.

SUMMARY OF THE INVENTION

Accordingly, it is the object of the present invention to provide an agricultural attachment for harvesting agricultural products attached in rows, which avoids the disadvantages of the prior art.

More particularly, it is on object of the present invention to provide an agricultural attachment for harvesting agricultural products arranged in rows, in which repair and cleaning works can be easily carried out, on the one hand, and the time of conversion of the attachment from its street transporting position to its operating working position for harvesting is consderably reduced.

In keeping with these objects and others which will become apparent hereinafter, one feature of the present invention resides, briefly stated, in an agricultural attachment having a plurality of product drawing and a plurality of hingedly mounted dividing elements associated with the product drawing elements so as to form together with the latter a plurality of product drawing passages, wherein each dividing element is composed of two parts which are articulately connected with one another so that they pivot to a position in which they assume a tipped roof shape and can be fixed in this position.

When the agricultural attachment is designed in accordance with the present invention, the drawing organs are easily accessible for cleaning and repair, on the one hand, and because of the pivoting of the tip part and body part of the dividing elements to their tipped roof position, shortening of the machine which is very important for its transportation and at the same time its reliable and stable arresting is attained, on the other hand.

In accordance with another feature of the present invention, the front tipped part of the dividers engages in engaging openings of the supporting parts provided at the front end of the frame and serving to fix the dividers in the above-mentioned position in which they have the tipped roof shape.

In accordance with still another advantageous feature of the present invention, means are provided for retaining the front tipped part of the dividers in the desired position during the operation, which means include a pulling rod extending through openings which are provided in the above-mentioned supporting parts mounted on the frame, on the one hand, and in angular members mounted on the front tipped part of the dividers on the other hand. Each pulling rod has an abutment at each end and a tightening pin at its other end.

Finally, in accordance with still a further advantageous feature of the present invention, the outer dividers are hingedly mounted at their rear ends on upper lateral covers of a picker box, because the outer dividers are longer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a lateral view of the front part of the inventive corn picker.

DESCRIPTION OF THE PREFERRED EMBODIMENTS

Figure 1:
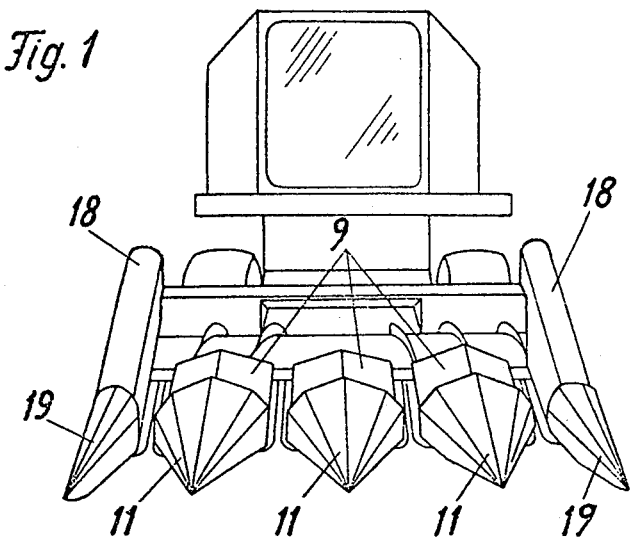
FIG. 1 is a front view of a corn picker in accordance with the present invention.
Figure 2:
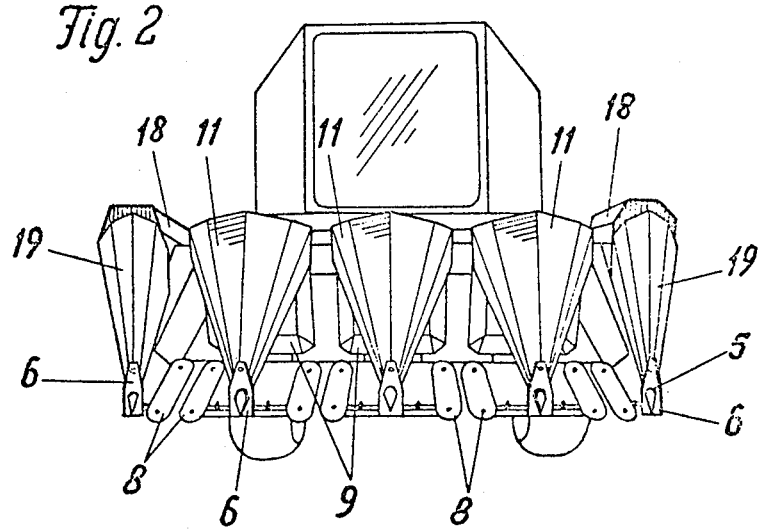
FIG. 2 is a view substantially corresponding to the view of FIG. 1 but showing the inventive corn picker with upwardly retracted divider hoods.

An attachment for harvesting cultural products arranged in rows, such as corn and the like, is shown in FIG. 3. A corn trough or box of a self-propelling corn picker is identified by reference 1. It is provided at its front end with a picker supporting tube 2 with an angular gearing 3 arranged on the latter.

A plurality of fixed frame parts 4 is mounted on the picker supporting tube 2 and on the angular gearing 3 so that they extend forwardly, as considered in traveling direction. Front ends of the frame parts 4 form upwardly extending supporting parts 6 provided with openings 5. The frame parts 4 carry in a conventional manner picker elements and drawing organs 7 and 8. The drawing organs 7 and 8 are covered over the greater parts by divider hoods 9 which rest on the frame parts 4 and are pivotally connected by hinges 10 with the angular gearing 3.

Divider tips 11 extend substantially from the front parts of the divider hoods 9 and are connected with the latter pivotally by pins 12. The divider tips 11 are held in the required position by pulling rods 13. The pulling rods 13 are supported at their one end by an angular member 14 connected with an upper edge of the respective divider pin 11. At the other end, the pulling rods 13 extend through openings provided in the supporting parts 6. The pulling rods 13 have rear end portions 15 rearwardly extending beyond the supporting part 6 and secured by tightening pins. On the other hand, the pulling rods 13 have front end portions extending forwardly beyond the angular members 14 and secured by plates 16 mounted on the pulling rods 13. For absorbing vibrations during the operation of the attachment, pressure springs 16' may be fitted onto the pulling rods 13 between the plates 16 and the angular members 14.

As can be particularly clearly seen from FIG. 3, the rear portion of the divider tips 11 overlaps the front end of the divider hoods 9. A gap formed in the region of overlapping is closed by an elastic cover 17 which is fixedly connected with the divider tips 11.

When the corn picker must be made ready for road transportation, the pulling rods 13 are released and the divider hoods 9 are pivoted upwardly about the hinge 10 to a position which is shown in dash-dot lines in FIG. 3. Simultaneously, the divider tips 11 are pivoted about the axis 12 to a position in which the divider hoods together with the divider tips form a tipped roof shape. The front ends of the divider tips 11 are introduced into the openings 5 of the supporting parts 6 and thereby the divider tips 11 and the divider hoods 9 are fixed in the above-mentioned position. When this position is assumed, the dividing organs 7 and 8 are free for required cleaning and repair works and can be easily accessible.

When the divider tips and hoods 11, 9 are lifted to their upper position, it is naturally also necessary for road transportation to lift outer dividers of the attachment as well. Each of the outer dividers includes a divider hood 18 and a divider tip 19 which are pivotally connected with one another. The divider hoods 18 are articularly mounted with the aid of hinges 20 at the side of an upper cover 21 of the picker box 1. The pivotable connection of the divider tips 19 with the divider hoods 18 of the outer dividers is carried out by pins 22. For lifting the outer dividers, the divider hoods 18 are pivoted upwardly about the hinges 20, and at the same time the divider tips 19 are pivoted relative to the divider hoods 18 so that they assume a position shown in dash-dot lines in FIG. 3. This position is also such that the divider hoods and divider tips of the outer dividers together form a tipped roof shape. The divider tips 19 are connected with the divider hoods 18 of the outer dividers by the pulling rods 13, similarly to the divider tips 11 and divider hoods 9 of the inner dividers.

It will be understood that each of the elements described above, or two or more together, may also find a useful application in other types of constructions differing from the types described above.

While the invention has been illustrated and described as embodied in an agricultural attachment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An agricultural attachment for harvesting agricultural products arranged in rows, such as corn and the like, comprising a frame having a front end as considered in the travelling direction; a plurality of product drawing elements; a plurality of hingedly mounted dividing elements associated with said product drawing elements so as to form together with the latter a plurality of product-drawing passages, each of said dividing elements having two parts which are articulately connected with one another so that they pivot relative to one another to assume a position in which they have a tipped roof shape and are fixable in said position, said two parts of each of said dividing elements including as considered in a travelling direction, a front tip-shaped part and a rear part articulately connected with said front part; and means for fixing said two parts of each of said dividing elements in said position, said fixing means being arranged to engage with said front tip-shaped part of each of said dividing members, said fixing means including supporting members arranged at said front end of said frame and having engaging openings in which said front parts of said dividing elements engage in said position.

2. An agricultural attachment as defined in claim 1, wherein said two parts of each of said dividing elements are pivotable to a further position in which said front part extends substantially in alignment with said rear part; and further comprising means for holding said two parts in said further position.

3. An agricultural attachment as defined in claim 2, wherein each of said supporting members has a through-going opening, each of said front parts of said dividing elements having an angular member also provided with a through going opening, said holding means including a pulling rod which extends through the through-going opening of each of said front parts and the through-going opening of a respective one of said angular member and has one end provided with an abutment and another end provided with a tightening pin.

4. An agricultural attachment for harvesting agricultural products arranged in rows, such as corn and the like, comprising a frame; a plurality of product drawing elements; and a plurality of hingedly mounted dividing elements associated with said product drawing elements so as to form together with the latter a plurality of product drawing passages, each of said dividing elements having two parts which are articulately connected with one another so that they pivot relative to one another to assume a position in which they have a tipped roof shape and are fixable in said position, said parts of each of said dividing elements including a front part and a rear part as coinsidered in a travelling direction, said two parts of each of said dividing elements having proximal ends which in said position together form a tip of said tipped roof shape and distal ends which in said position form lower ends of said tipped roof shaft; and means for fixing the distal end of at least one of said parts so as to retain said at least one part in said position.

5. An agricultural attachment as defined in claim 4, wherein said dividing elements include inner dividing elements and outer dividing elements, each of said inner dividing elements having a rear end hingedly connected with said frame.

6. An agricultural attachment as defined in claim 4, wherein said fixing means is arranged to engage with said front part of each of said dividing members.

7. An agricultural attachment as defined in claim 4; further comprising a picking box provided with an upper lateral cover, said dividing elements including inner dividing elements and outer dividing elements, each of said outer dividing elements having an end hingedly connected with said upper lateral cover.

* * * * *